United States Patent [19]
Gionta

[11] Patent Number: 5,634,681
[45] Date of Patent: Jun. 3, 1997

[54] TRUCK MOUNTED WORK STATION

[76] Inventor: Mark S. Gionta, 85 King Arthur's Ct., Rochester, N.Y. 14626

[21] Appl. No.: 417,817

[22] Filed: Apr. 6, 1995

[51] Int. Cl.$^6$ .............................................. B60P 3/32
[52] U.S. Cl. .............................. 296/3; 108/44; 224/405
[58] Field of Search .............................. 296/3; 108/44; 224/403, 405

[56] References Cited

U.S. PATENT DOCUMENTS

| | | | |
|---|---|---|---|
| 3,589,576 | 6/1971 | Rinkle et al. | 224/405 |
| 3,934,924 | 1/1976 | Diliberti | 108/44 X |
| 5,090,335 | 2/1992 | Russell | 108/44 |
| 5,255,951 | 10/1993 | Moore, III | 296/3 |
| 5,431,472 | 7/1995 | Coffland | 296/3 |

*Primary Examiner*—Joseph D. Pape
*Attorney, Agent, or Firm*—Robert J. Bird

[57] ABSTRACT

A truck-mounted work station includes a frame forming an open rack for tools and supplies, and pivot arms extending from the frame to support a work table or the like. The work table is movable with the pivot arms between an elevated storage position within the width limit of the truck, and a lowered working position outside and alongside the truck. A torsion spring facilitates raising and lowering the work table. Spring torsion is adjustable to suit its load. Up and down travel of the pivot arms is limited by stops. The work table is secured in its elevated position for safe travel.

6 Claims, 4 Drawing Sheets

TRUCK MOUNTED WORK STATION

BACKGROUND OF THE INVENTION

1. Technical Field

This invention is a work station, including storage rack and retractable work table, for the back of an open truck.

2. Background Information and Disclosure under 37 CFR 1.97–1.99

There are various forms of truck racks in the prior art. U.S. Pat. No. 5,316,190 to Bullock is an example. Bullock discloses a truck utility rack which is pivoted for movement between a closed configuration when it is not in use, and an open configuration for load carrying.

It is an object of this invention to provide a truck mounted work station with a storage rack for materials, and retractable work table for use outside and alongside the truck.

SUMMARY OF THE INVENTION

A truck-mounted work station according to this invention includes a frame forming an open rack for tools and supplies, and pivot arms extending from the frame to support a work table or the like. The work table is movable with the pivot arms between an elevated storage position within the width limit of the truck, and a lowered working position outside and alongside the truck. A torsion spring connected to the frame and to the pivot arms facilitates raising and lowering the work table. Spring torsion is adjustable to suit its load. Up and down travel of the pivot arms is limited by stops. The work table is secured in its elevated position for safe travel.

DRAWING

DESCRIPTION OF PREFERRED EMBODIMENT

Figure 1:
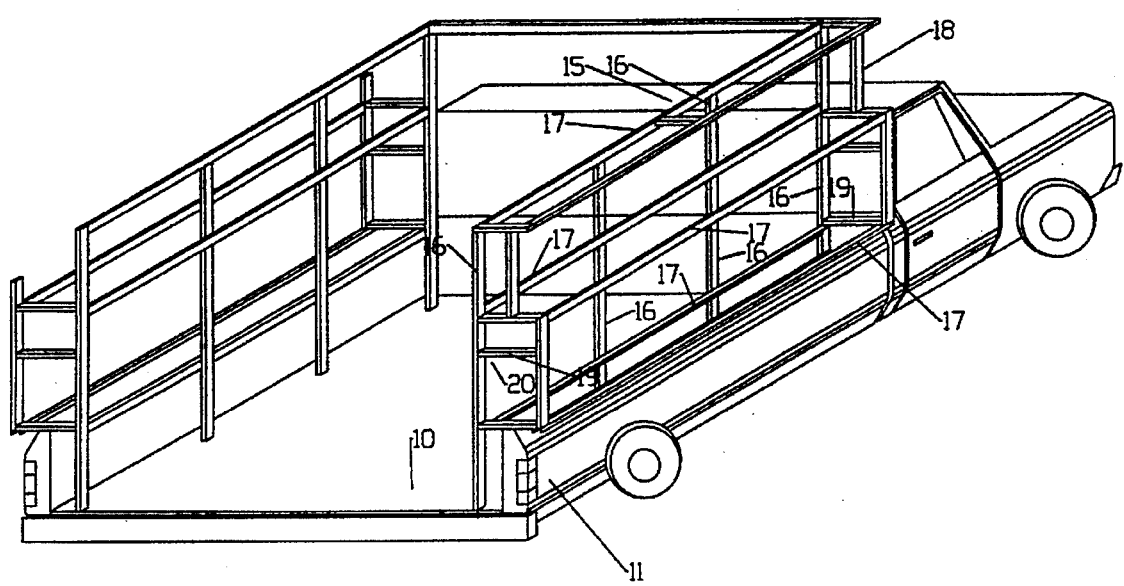
FIG. 1 is a pictorial view of the rear of an open truck, including a work station according to this invention.

FIG. 1 shows the environment of this invention. The back of an open truck includes a standard bed 10, sidewalls 11, and wheel wells 12. The truck further includes two work stations, one on each side. The two work stations are similar, or they differ only incidentally, so only the one on the right side of the truck, will be described.

The work station includes a frame 15 of vertical columns 16, longitudinal horizontal rails 17, vertical braces 18, and crossbars 19. These members 16, 17, 18, 19 together form a rack which stands on the truck bed 10. The rack is additionally supported by the sidewall 11, and extends laterally over the sidewall 11. The rack provides open spaces for placement of tool boxes, supply bins, drawers and the like, as desired by the user.

Figure 2:
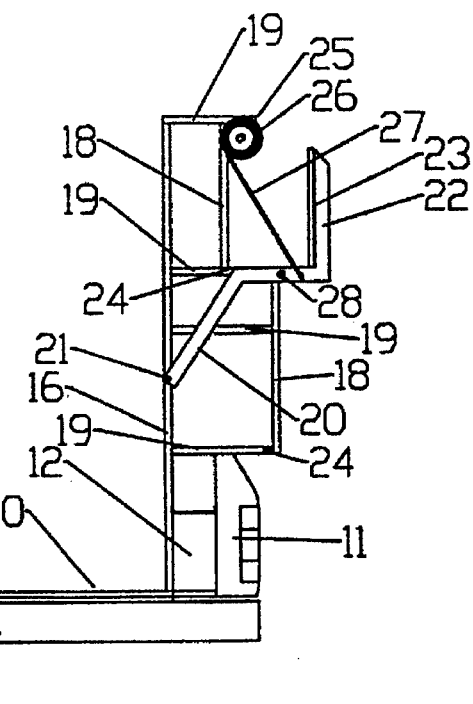
FIG. 2 is a partial rear view of one work station with the work table in its elevated storage position.
Figure 4:
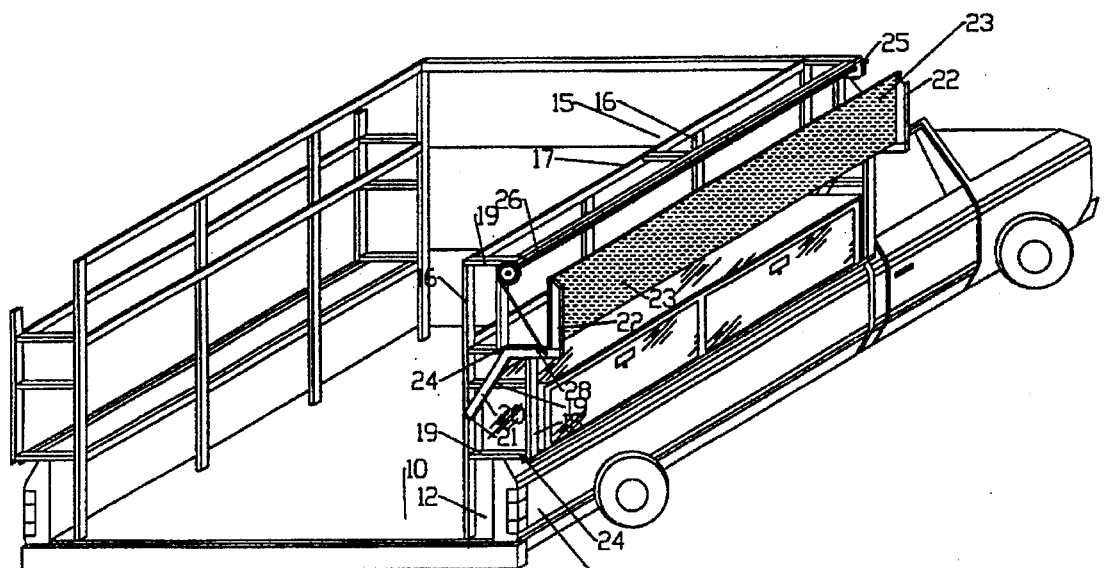
FIGS. 4 and 5 are pictorial views of the apparatus of FIGS. 2 and 3 respectively.

In FIGS. 2 and 4, a first pivot arm 20 is pivotally connected to a vertical column 16 by a pivot pin 21. A second pivot arm 20, not visible behind the first, is similarly pivoted to another vertical column 16 at the front end of the frame. The arms 20 are pivoted for vertical movement. The pivot arms 20 extend outward of the truck, and each of them includes a table support section 22 at its outer end. The table support sections 22 are up out of the way, and in a vertical attitude.

An end bracket 25 is mounted on an upper frame member, such as a top crossbar 19. A second bracket 25, not visible behind the first, is similarly mounted at the front end of the frame. An elongated helical torsion spring 26 is mounted between, and anchored to, the end brackets 25. The spring 26 is operatively connected by cables 27 to the pivot arms 20 to urge them toward the elevated position shown in FIGS. 2 and 4. The torsion spring 26 is typical of such springs as are used with overhead garage doors to assist in raising them, and to resist their coming down of their own weight. As in the case of the garage doors, the torsion of the spring 26 is adjustable to suit the load it is intended to carry.

Figure 3:
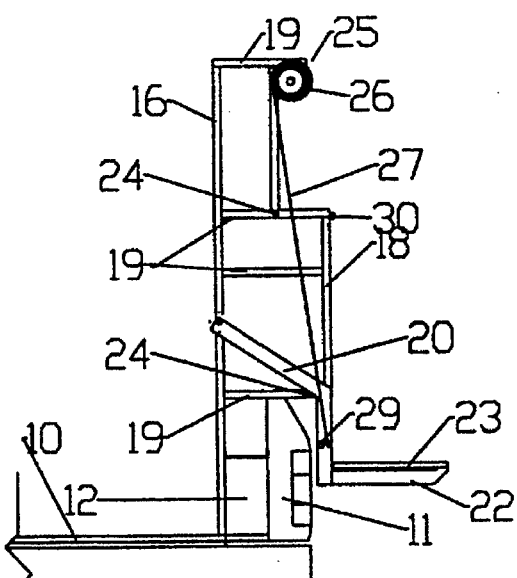
FIG. 3 is similar to FIG. 2, with the work table in its lowered working position.
Figure 5:
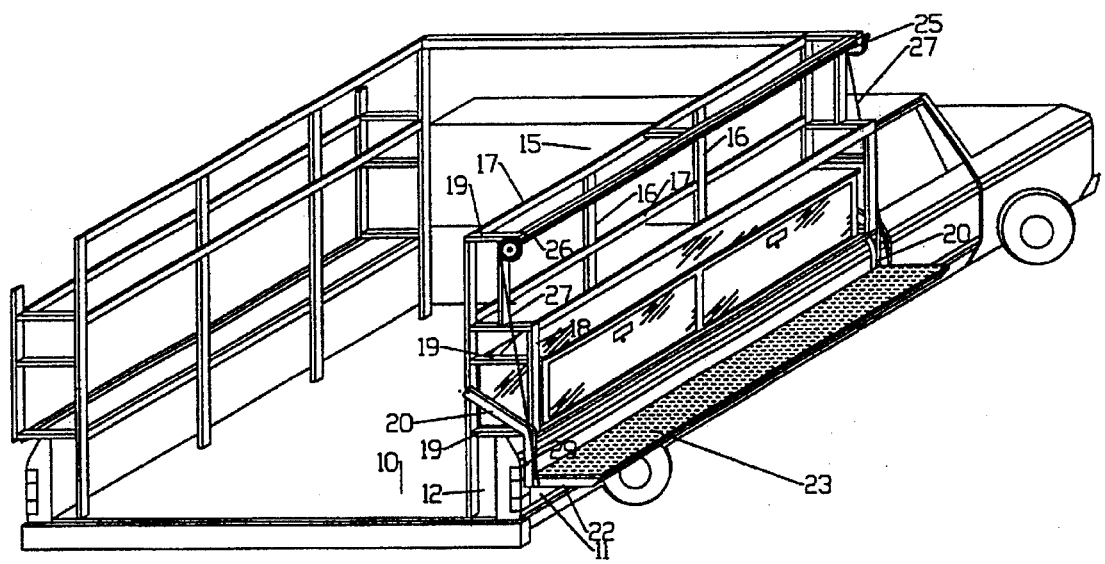

In FIGS. 3 and 5, the pivot arms 20 are in their lowered position and the table support sections 22 are in a horizontal working position. The table support sections 22 support a work table 23.

"Work table" is intended as a generic term to include not only a flat table but any useful apparatus which might be mounted on the supports 22. Certain specialized uses are contemplated, such as a brake for example. A brake is a machine tool for bending sheet metal such as the sheeting materials used in house siding and roofing work. A brake is typically 8 or 10 feet long and is a rather massive tool. It is customarily carried on the back of a truck and manually unloaded and set on the ground for use. At the end of the work day, it is reloaded on the truck. The brake is one example of apparatus supported by the support sections 22.

Stop pins 24 on both upper and lower frame members limit the upward and downward travel of the pivot arms 20. In the raised position of FIGS. 2 and 4, the pivot arms 20 are releasably secured in place relative to the frame 15 by slide bolts 28 received in aperture 29 in the pivot arms 20 and apertures 30 associated with the frame 15.

In the raised position shown in FIGS. 2 and 4, the work table 23 is up and in. That is, the work table 23 is retracted within the width limit of the truck and suitable for road travel. In the working position shown in FIGS. 3 and 5, the work table 23 is at a convenient height, like a work bench, alongside the truck.

As stated earlier, the pivot arms 20 and support sections 22 may support a simple work table 23, or a brake, or some other tool. Whatever the load, the torsion spring 26 is adjustable so that the work table can be raised and lowered with one hand and very little effort.

Figure 6:
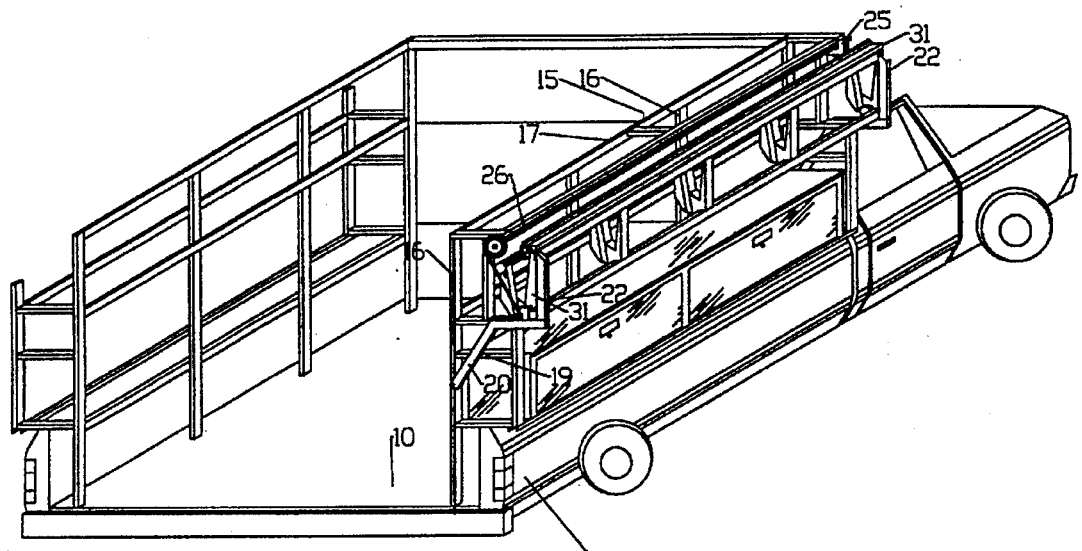
FIGS. 6 and 7 are similar to FIGS. 4 and 5, showing the work station as including a specialized tool.
Figure 7:
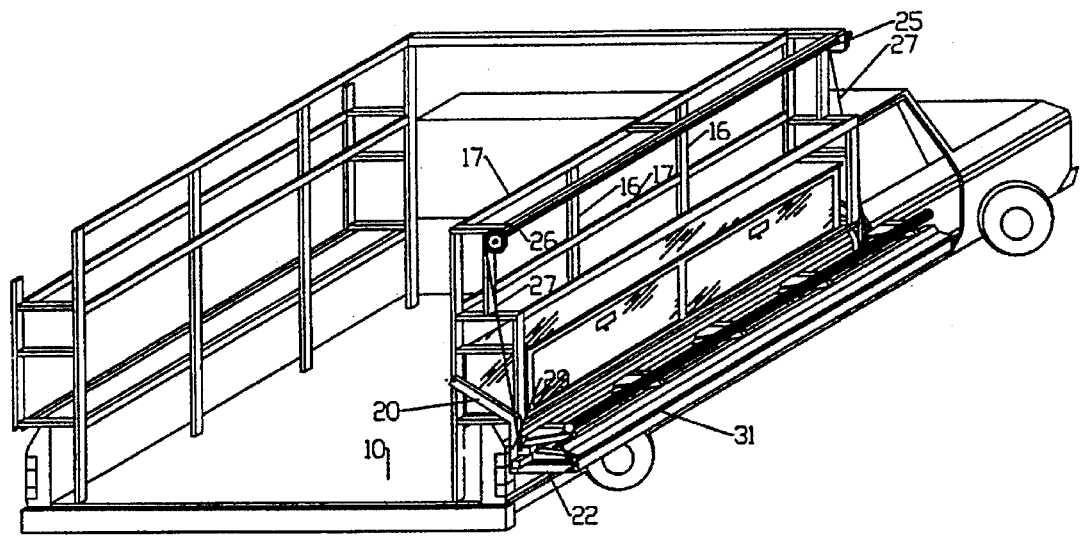

In FIGS. 6 and 7, the pivot arms 20 support a brake 30, which is up in its storage position in FIG. 6, and down in its working position in FIG. 7. The brake itself is known in the prior art. Its detailed illustration and description are not essential for an understanding of this invention.

The foregoing description of a preferred embodiment of this invention, including any dimensions, angles, or proportions, is intended as illustrative. The concept and scope of the invention are limited only by the following claims and equivalents thereof.

What is claimed is:

1. A work station for the back of an open truck, including:

a frame on the back of said truck;

a pivot arm pivotally connected to said frame and extending laterally outward therefrom, and including a table support section at its outer end;

a work table supported on said table support section for movement with said pivot arm between an elevated storage position within the width limit of said truck, and a lowered working position outside and alongside said truck; and a longitudinal torsion spring operatively connected to said frame and to said pivot arm to urge said pivot arm toward said elevated position.

2. A work station for the back of an open truck, including:

a frame on the back of said truck;

first and second pivot arms pivotally connected to said frame and extending laterally outward therefrom, each said pivot arm including a table support section at its outer end;

a work table supported on said table support sections for movement with said pivot arms between an elevated storage position within the width limit of said truck, and a lowered working position outside and alongside said truck; and a longitudinal torsion spring operatively connected to said frame and to said pivot arms to urge said pivot arms toward said elevated position.

3. A work station as defined in claim 2, in which the torsion of said spring is adjustable.

4. A work station as defined in claim 2, further including:

stop means on said frame to limit the vertical movement of said pivot arms; and lock means to secure said pivot arms in place relative to said frame in said elevated position.

5. A work station for the back of an open truck having a bed and a sidewall, said work station including:

a frame mounted on said bed and forming an open rack extending laterally over said sidewall;

first and second pivot arms pivotally connected to said frame and extending laterally outward therefrom, each said pivot arm including a table support section at its outer end;

a work table supported on said table support sections for movment with said pivot arms between an elevated storage position within the width limit of said truck, and a lowered working position outside and alongside said truck; and a longitudinal torsion spring operatively connected to said frame and to said pivot arms to urge said pivot arms toward said elevated position.

6. A work station as defined in claim 5, in which said work table includes a brake.

* * * * *